US005304410A

United States Patent [19]

Webster

[11] Patent Number: 5,304,410

[45] Date of Patent: Apr. 19, 1994

[54] CUTTING CLOTH WEB HAVING MOUNTED BACKING MATERIAL AND RELATED METHOD

[75] Inventor: Ronald B. Webster, Vernon, Conn.

[73] Assignee: Gerber Scientific Products, Inc., Manchester, Conn.

[21] Appl. No.: 694,792

[22] Filed: May 2, 1991

[51] Int. Cl.[5] .......... B32B 3/00; B26D 1/00

[52] U.S. Cl. .......... 428/40; 40/299; 40/595; 428/41; 428/99; 428/195; 428/212; 428/246; 428/252; 428/284; 428/286; 428/350; 428/354; 428/355; 428/356; 428/412; 428/537.5; 428/913; 428/914

[58] Field of Search .......... 428/40, 41, 99, 195, 428/212, 914, 913, 350, 354, 246, 356, 252, 284, 286, 355, 412, 537.5; 40/595, 299

[56] References Cited

U.S. PATENT DOCUMENTS

| | | | |
|---|---|---|---|
| 1,926,918 | 9/1933 | Sexton | 428/246 |
| 2,410,884 | 12/1946 | Lawrence, Jr. | 428/246 |
| 3,574,667 | 4/1971 | Fournier | 428/246 |
| 3,730,825 | 5/1973 | Nakane | 428/350 |
| 4,188,445 | 2/1980 | Hill | 428/246 |
| 4,448,808 | 5/1984 | Pearl | 427/208.6 |
| 4,467,525 | 8/1984 | Logan et al. | 33/18 B |
| 4,685,363 | 8/1987 | Gerber | 83/22 |
| 4,732,069 | 3/1988 | Wood et al. | 83/881 |
| 4,895,747 | 1/1990 | Birkholz | 428/350 |
| 4,946,320 | 8/1990 | VanderMey | 409/132 |
| 5,026,584 | 6/1991 | Logan | 428/41 |

FOREIGN PATENT DOCUMENTS

| | | |
|---|---|---|
| 3243368 | 10/1988 | Japan . |
| 454452 | 10/1936 | United Kingdom . |

*Primary Examiner*—Ellis P. Robinson
*Assistant Examiner*—Nasser Ahmad
*Attorney, Agent, or Firm*—McCormick, Paulding & Huber

[57] ABSTRACT

A cutting cloth web having a multilayer construction comprises a generally elongate base layer of material having a first surface disposed on one side and having a second surface disposed on its side facing oppositely thereof and includes a generally elongate sheet of fabric material having a first surface disposed on one side thereof and a second surface disposed on its opposite side and facing the base layer second surface. The base layer and the fabric sheet are releasably attached to one another by holding means interposed between the second surface of the fabric material and the second surface of the base layer maintaining the two sheets in registry with one another such that a closed shape may be cut in the fabric material without disrupting the registration between the base layer and the sheet of fabric material as provided for by the holding means.

27 Claims, 5 Drawing Sheets

CUTTING CLOTH WEB HAVING MOUNTED BACKING MATERIAL AND RELATED METHOD

BACKGROUND OF THE INVENTION

This invention relates to improvements in cutting cloth and a related method of use wherein a fabric sheet is mounted onto a backing sheet and secured against movement thereon by a suitable holding means allowing a closed shape to be cut in the fabric while being supported on the backing sheet and subsequently readily separated from it once the closed shape has been cut.

In the highly automated garment industry, pattern pieces defining parts of a total design are often defined numerically and stored electronically in memory of a computer whereupon a pattern may be projected on a CRT screen for viewing by the user. These pattern pieces are often arranged by the computer to define a marker electronically stored and manipulated by the computer so as to maximize efficiency of space between the related pattern pieces when laid out on the marker. In this way, the electronic pattern data can be used to drive a large numerically controlled automated cutting machine capable of continuously cutting pattern pieces into a very sizable lay-up of sheet material supported on a work table. An example of one such large scale cloth cutting machine is disclosed in U.S. Pat. No. 4,133,235 entitled CLOSED LOOP APPARATUS FOR CUTTING SHEET MATERIAL issued to H. J. Gerber on Jan. 9, 1979.

However, while such applications of computer driven cutting machines are very effective on a large scale basis, there are other applications which do not necessarily require the large scale capabilities provided by machines, such as disclosed in the aforementioned patent. For example, in smaller applications, such as with an individual who desires to make his or her own garment by using a store bought pattern, such a pattern may be purchased as numeric data encoded on a suitable storage medium defining a particular pattern design which may be inputted into a personal computer and subsequently used to drive a low cost cutter connected to the computer. Additionally, it may be desirable to allow the designer of such pattern pieces the capability to cut pattern pieces as they are designed in order to allow them to be fitted to a mannequin during the design operation in a manner such as disclosed in copending U.S. patent application Ser. No. 07/694,666, entitled A PATTERN DEVELOPMENT SYSTEM filed in the name of Thomas Clarino, et al. on May 2, 1991. In this way, individual pattern pieces or other graphics may be automatically cut using a compatible, low-cost cloth cutting system connected to a computer which directs the cutting of the sheet material by numeric control. Thus, there is a need given the inherent dimensional instability of fabric sheet material, to provide a cutting cloth web with a means by which it can be independently supported when placed in such low-cost machines for cutting since these machines do not have the elaborate cutting beds which accompany the large scale cutters.

Accordingly, it is an object of the present invention to provide a cutting cloth mounted to a backing sheet which is capable of being readily fed in advancement into an automated cutter performing a cutting operation on it without causing the fabric to be harmed by such advancement.

It is another object of the present invention to provide different types of holding means which, depending on the type of material and the manner in which it is to be cut and used, hold the fabric constituting the cutting cloth onto the backing sheet such that the cloth may be driven in advancement through automated machines which may have different material drives.

A still further object of the present invention is to provide a cutting cloth mounted on a backing sheet of the aforementioned type such that the cut sheet material carried by the backing when removed from it is not marred or damaged by the means which holds it to the backing material.

Still a further object of the present invention is to provide a system wherein a cutting cloth mounted on a backing material of the aforementioned type can be cut by a low-cost cutter in accordance with numeric data stored in memory of a computer connected to it and driving the cutting machine.

Further objects and advantages of the invention will become apparent from the following specification and appended claims.

SUMMARY OF THE INVENTION

A cutting cloth web having a multilayer construction comprises a generally elongate base layer of material having a first surface disposed on one side and having a second surface disposed on the side facing oppositely thereof and includes a generally elongate sheet of fabric material having a first surface disposed on one side thereof and a second surface disposed on its opposite side and facing the base layer second surface. The base layer and the fabric sheet are releasably attached to one another by holding means interposed between the second surface of the fabric material and the second surface of the base layer maintaining the two sheets in registry with one another such that a closed shape may be cut in the fabric material without disrupting the registration between the base layer and the sheet of fabric material as provided for by the holding means.

The invention further resides in a method of cutting a cloth web of a multilayer construction using an automated cutting system comprising the steps of providing a controller having means by which a closed shape to be cut is defined; providing the web such that it includes a base layer and a sheet of fabric material releasably secured to it by a holding means; providing a cutting machine linked to the controller for receiving instructions from it to cut a closed shape into the web; and cutting a closed shape in the fabric material sheet while only slightly scoring the base layer which supports it and subsequently separating the cut closed shape from the remaining fabric sheet.

DETAILED DESCRIPTION OF THE PREFERRED EMBODIMENT

Figure 1:
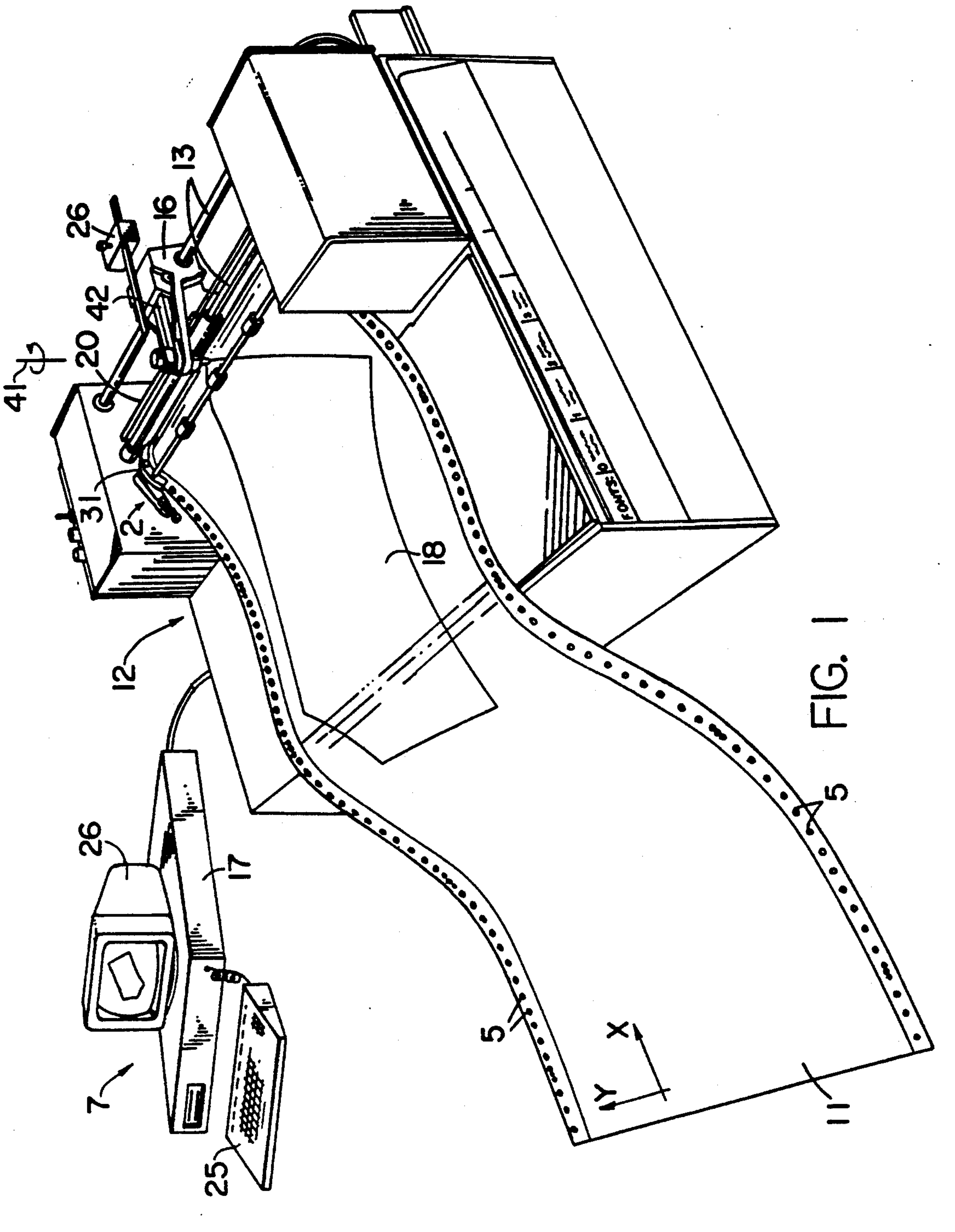
FIG. 1 is a perspective view of a cutting machine capable of being used to automatically cut a pattern piece in a web of cutting cloth material embodying the invention.

In FIG. 1, a sign machine 12 is illustrated for handling and working on an associated cutting cloth web 11 of laminated construction, a layer of which includes a sheet of fabric material into which a closed shape is cut. The web 11 is moved longitudinally of itself through the machine in the illustrated X-coordinate direction by material advancing means 2 across a work surface defined either by a platen or by the illustrated roller 20. A tool head 16 is supported and driven by appropriate motor means (not shown) in the illustrated Y-coordinate direction on ways 13 extending transversely relative to the web 11. The machine 12 is connected to a controller 7 herein illustrated as a separate unit, comprised of a central unit 17 having a microprocessor and appropriate memory means for storing and executing commands input to it by a key interface 25 and a monitor 26 connected to the central unit 17 for displaying a desired graphic shape onto the screen and allowing the user to see the projected shape prior to its being cut into the fabric sheet by the machine 12. The controller 7 is connected to the machine 12 by an appropriate bus allowing it to drive the machine so as to cause coordinated movement of the web 11 relative to the tool head thereby cutting a closed shape 18 in it. Alternatively, the machine 12 may be one, such as disclosed in U.S. Pat. No. 4,467,525 entitled AUTOMATED SIGN GENERATOR, issued to Logan et al. on Aug. 28, 1984, which patent being commonly assigned with the assignee of the present invention and discloses an apparatus wherein the controller, the user keyboard interface, the cutter, and the related web feeding mechanism are all integrally combined in a single unit.

Figure 2:
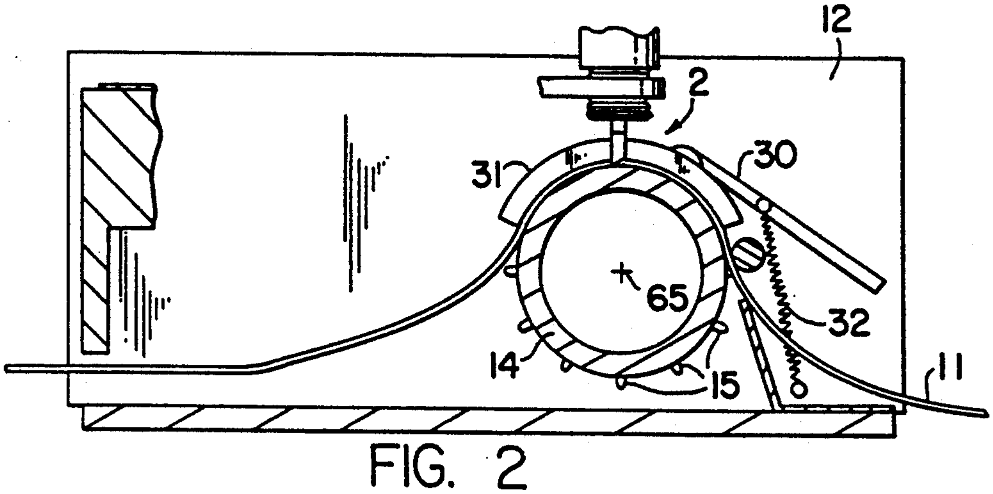
FIG. 2 is a vertical sectional partially fragmentary view showing a cutting knife in engagement with the cutting cloth web being advanced by the apparatus of FIG. 1.

Referring now to FIG. 2 and to the material advancing means 2 used for controlled advancement of sections of the web through the machine 12, it will be seen that the advancing means 2 includes two sprockets 14,14 (one shown) rotatably driven by appropriate drive means about a common axis of rotation 65 in response to commands issued by the controller 7. The sprockets 14,14 are spaced apart from one another by approximately the width of the web 11, and in the one embodiment of the invention each has a series of circumferential teeth or pins 15,15 projecting radially outwardly from the axis 65. In this embodiment the pins 15,15 are adapted to be received within a series of openings 5,5 extending along either side margin of the web to affect its positive movement through the machine 12. The openings 5,5 may be ordered in a particular manner, such as disclosed in U.S. Pat. No. 4,708,919, entitled CODED WEB AND ASSOCIATED WEB HANDLING AND WORKING MACHINE issued to Kenneth Wood on Nov. 24, 1987. Thus, the pins 15,15 being appropriately spaced from one another are received within respective ones of the series of openings 5,5 extending along either side of the web in order to effect positive driving movement of it through the machine 12. To maintain coaction of the web side margins with each of the sprockets, an associated arcuate clamp 31 is provided and is connected to the machine 12 by a pivotal support arm 30 biassed toward the involved sprocket by a spring 32 drawing the clamp against the web as it is pulled through the machine. As is thus apparent, the web 11 is readily removable from the machine, yet is held in registry with it during the cutting operation.

Figure 3:
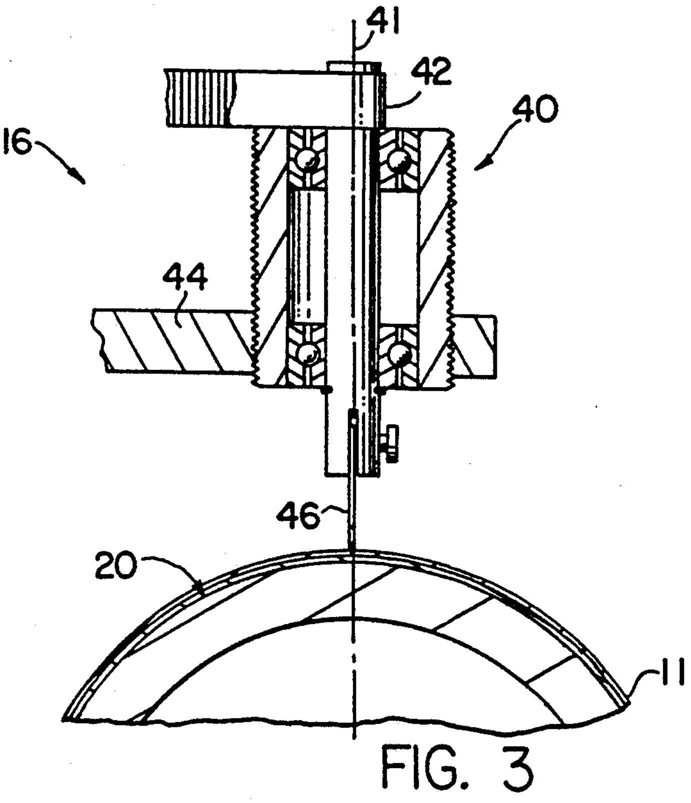
FIG. 3 is a side elevational partially fragmentary sectional view showing the cutting knife in engagement with the cutting cloth web supported below it.

In FIG. 3 the tool head 16 is shown and includes a tool holder 43 and an associated tool 46 rotatable relative to the head about an axis 41 oriented substantially vertically when the tool is in the working position above the web as illustrated in FIG. 1. The tool head 16 is pivotally mounted on the ways 13 such that the tool holder 43 is cantilevered outwardly therefrom on an arm 44 allowing the holder and its associated tool herein shown as a blade 46 to be normally urged downwards toward the web by gravity or by additional means acting to increase the downward pressing force of the blade. This means may include a variable positionable counterweight 26 mounted to the tool head 16 so as to vary the amount of downward pressure applied to the web 19 or alternatively may include a mechanical device having a variable tensioning spring mechanism for applying discrete amounts of downward force to the web through the tool holder. Thus, the pressure of the knife 46 on the web 11 during cutting is controllable by such means as the counterweight 26 so that the depth of penetration of the blade can be adjusted and held at a substantially constant value. The depth of penetration as explained in more detail hereinafter is such that during the cutting process the web 11 is cut through less than the full extend of its thickness.

The tool holder 43 may be caused to rotate about the axis 41 in two modes of operation. The first mode of operation is one such that the tip of the blade 46 is slightly offset from the axis 41 such that it swivels in response to the combined movements of the web and the tool head so as to drag the tip along a desired line of cut. In the second illustrated mode of operation the rotation of the tool holder 43 about the axis 41 is effected by a drive belt 42 rotatably coupling the tool holder to a theta motor (not shown) angularly driving the blade 46 in response to commands issued by the controller 7.

FIGS. 4 through 9 show in further detail the construction of the web 11 of FIG. 1 made in accordance with this invention. The web 11 is comprised of a base layer or carrier sheet 30 and a superimposed layer or sheet of fabric material 32. The fabric layer has an outwardly exposed surface 38 and an inwardly directed surface 40 facing the base layer 30. The base layer 30 has an undersurface 42 which coacts with the support roller 20 and has an oppositely facing inner surface 45 facing the fabric material sheet 32. Interposed between the base layer 30 and the sheet of fabric material 32 is a holding means maintaining registry of the fabric material sheet 32 with that of the underlying base or carrier sheet 30. In the embodiment shown in FIGS. 4 and 5, this means is comprised of a low tack pressure sensitive adhesive layer 36 releasably bonding the fabric material sheet 32 and the base layer 30 to one another. As governed by the intended use of the fabric material, the adhesive layer 36 may remain adhered to the base layer, such as in the case where the cut pieces are to be sewn onto another material sheet, or the adhesive may be pulled off with the involved cut fabric piece for application onto a substrate surface. To effect the latter use, the base layer 30 may include a release surface 46 disposed on its inner surface 45 such that the adhesive layer 36 adheres more strongly to the fabric material than to the base layer 30 when the cut closed shape is separated from the length of fabric material which remains bonded to the base layer.

Figure 4:
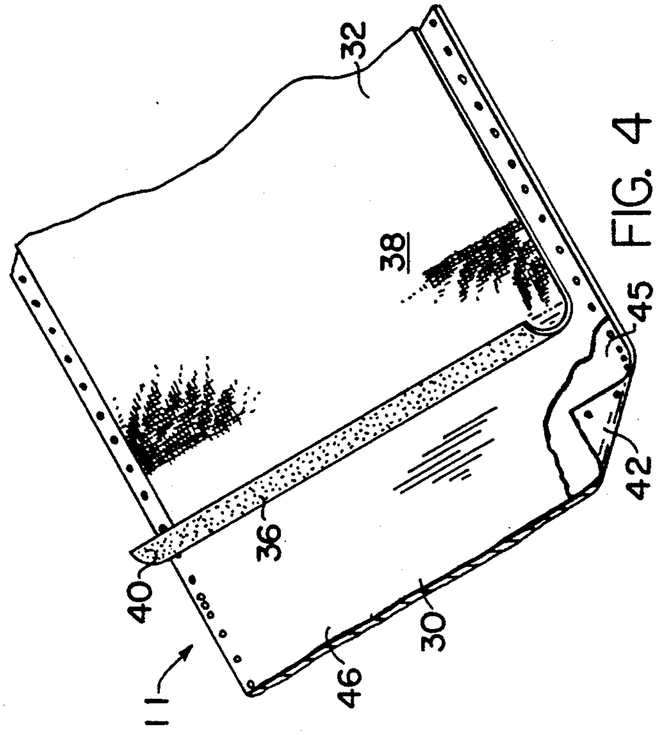
FIG. 4 is a perspective view of the cutting cloth web showing the base layer and the fabric sheet between which is interposed an adhesive layer.
Figure 5:
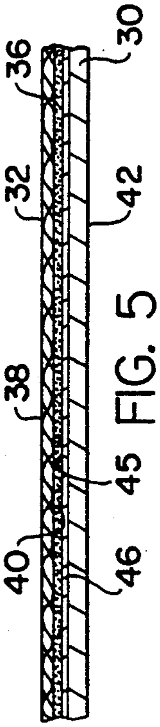
FIG. 5 is a vertical sectional view through the web of FIG. 4.

The material comprising the adhesive layer 36 may take many forms including being a soluble adhesive capable of being subsequently dissolved from the fabric material by application of a suitable solvent. For example, the base layer 30 may be formed from paper without the release surface 46 on it and the adhesive layer 36 may be a water soluble adhesive which bonds the fabric sheet 32 to the base layer 30 in its dry state but allows separation of the fabric to occur when, for example, the web is placed into a water bath after a cutting operation thereby dissolving the adhesive and separating the cut shape from the remaining fabric web length. In the preferred embodiment however, the adhesive layer 36 is a permanently tacky pressure sensitive adhesive having a rubber or acrylic base requiring the cut fabric shape to be weed from the unwanted fabric which remains adhered to the base layer. Preferably, the material constituting each of the base and fabric layers is selected such that when the cut fabric shape is weed, the adhesive remains adhered to the base layer rather than to the fabric which has been cut. Also, as can be seen in FIGS. 1 and 4, in this embodiment, the width of the fabric sheet is somewhat less than that of the base layer 30, thus exposing the openings 5,5 along each marginal edge.

Referring back to FIG. 3, it should be seen that the tool head 16 and its associated blade or other cutting instrument 46 is pressed downwards into engagement with the fabric material sheet 32 sufficiently to cut it through while only slightly scoring the underlying base layer 30 which supports it. To this end, the base layer 30 is thus made from a relatively substantial piece of paper usually 80 to 100 pound weight with sufficient thickness on the order of about 8 to 10 mils to adequately resist cutting through during the cutting operation by the tool 46. Alternatively, the base layer could be formed from a less heavy or thick material having a hardness sufficient to resist cutting by the knife 46, an example of which is polycarbonate in thin sheet form.

Figure 6:
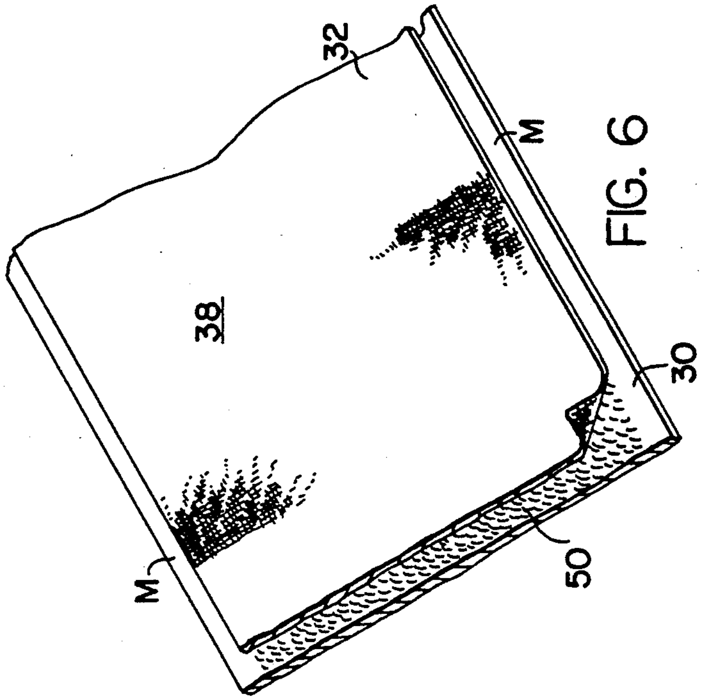
FIG. 6 is a perspective view of a second embodiment of the cutting cloth web in which the fabric sheet material is held onto the base layer through the intermediary of a multiplicity of hooks.
Figure 7:
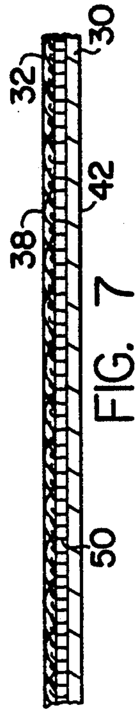
FIG. 7 is a vertical sectional view through the web of FIG. 6.

Referring to FIGS. 6 and 7 and to the second alternative embodiment of the holding means used to secure the fabric material sheet 32 in registry with the base layer 30, it should be seen that in this embodiment the holding means 34 is comprised of a multiplicity of small hook-like projections 50,50 extending outwardly from the base layer 30 and towards the fabric material sheet 32. The fabric material used in this embodiment has a texture sufficient to present a mat of woven fabric which has sufficient interstitial spacing between threads allowing the projecting hook elements to be trapped therein. The hook elements 50,50 are best described as the hook parts of a VELCRO fastener which allow the fabric material 32 to be secured against movement relative to the base layer 30 yet readily allow the shape cut in the fabric sheet 32 to be separated by pulling from the base layer 30 after cutting. The base layer 30 may be formed from a molded plastic sheet with the hooks 50,50 integrally formed therewith and having sufficient flexibility where necessary to be fed through the machine 12 along the curved path defined by the roller 20.

Figure 8:
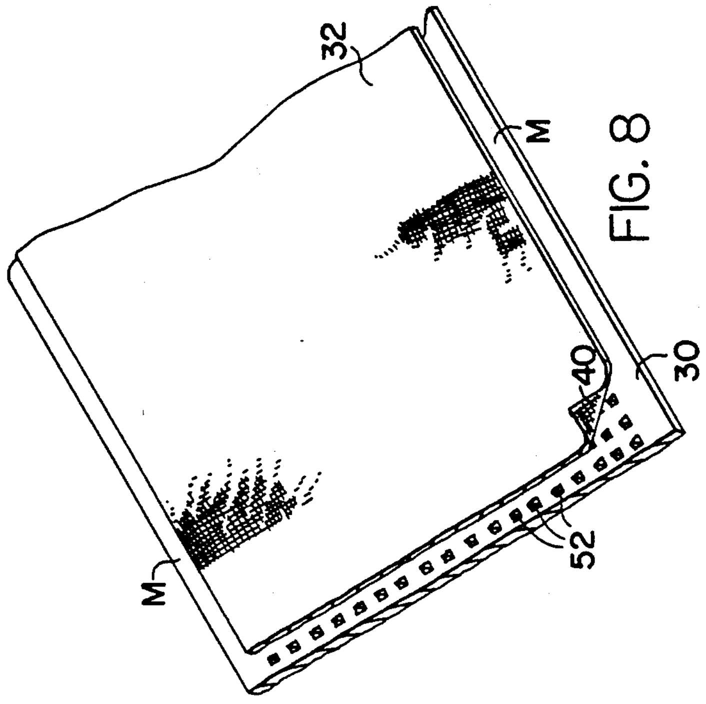
FIG. 8 is a perspective view of the third alternative embodiment of the cutting cloth web wherein the base layer has a multiplicity of pointed projections.
Figure 9:
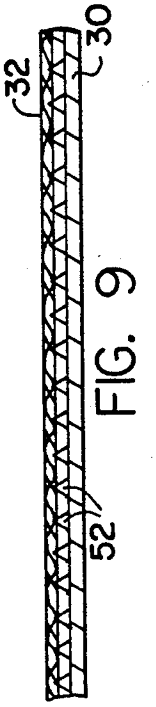
FIG. 9 is a vertical sectional view through the web of FIG. 8.

In FIGS. 8 and 9 the base layer 30 in a third alternative embodiment of the invention includes a multiplicity of projections disposed on its upper surface which grip the undersurface 40 of the fabric material 32 to hold it in registry with the base layer which supports it. The projections 52,52 may be conical or pyramidal in shape and may be integrally formed with the base layer, such as by a plastic molding technique. They may further have a height, for example of only about one sixteenth inch or so, permitting sufficient gripping between the fabric crossings of a given cloth, for example muslin, without harming the individual fabric threads. The projections 52,52 are arranged in rows spaced about one-sixteenth to one-eighth inch from each other and spaced about the same distance from each other in rows so as to provide about 120 equidistantly spaced projections per square inch.

Figure 10:
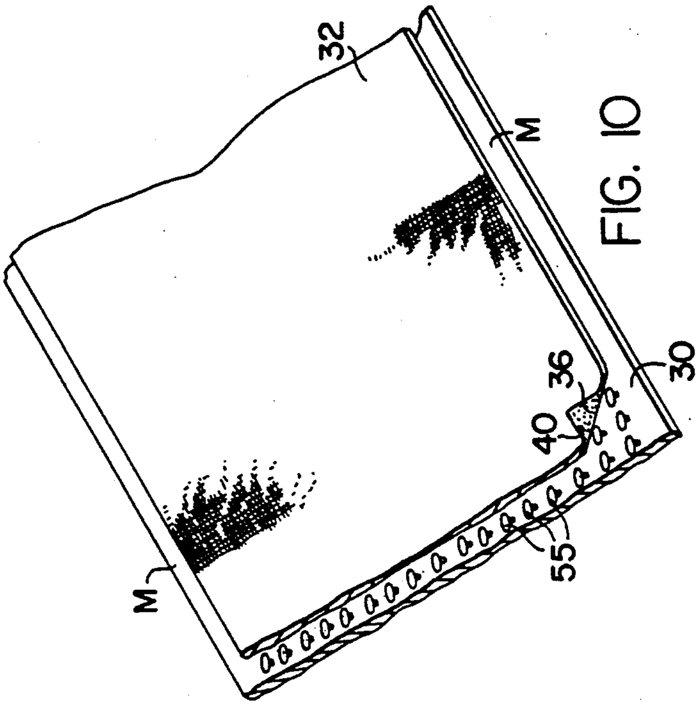
FIG. 10 is a perspective view of a fourth alternative embodiment of the cutting cloth web wherein the base layer provides an elevated support surface for penetration by a reciprocating knife.
Figure 11:
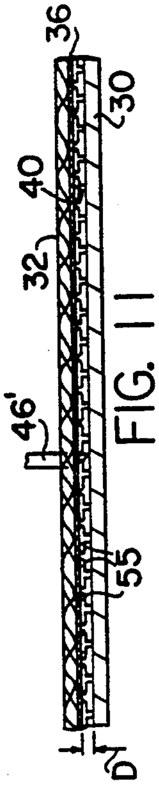
FIG. 11 is a vertical sectional view through the web of FIG. 10.

As shown in FIGS. 10 and 11, a fourth embodiment of the web 11 is shown wherein the fabric material sheet 32 is supported above the base layer 30 by a multiplicity of flexible support elements 55,55 extending upwards from the base layer to provide a penetrable surface allowing for reciprocated cutting of the fabric by a blade 46'. Each of the elements 55,55 has a head which is sizably greater in diameter than its stem portion connecting the associated head in spatial relationship to the base layer a distance equal to equally, for example about one-quarter inch. The spacing D is important in this embodiment in that it allows the lower tip of the reciprocating blade 46' with each stroke to penetrate below the undersurface 40 of the fabric sheet, but not into the supporting base layer. To maintain registration of the fabric material sheet with that of the base layer 30 which supports it, the undersurface 40 of the fabric material sheet is provided with a layer of pressure sensitive adhesive which releasably holds it on the heads of the support elements 55,55. The support elements 55,55 are preferably formed from plastic and are thus capable of being deflected out of the travel path of the blade 46'.

Figure 12:
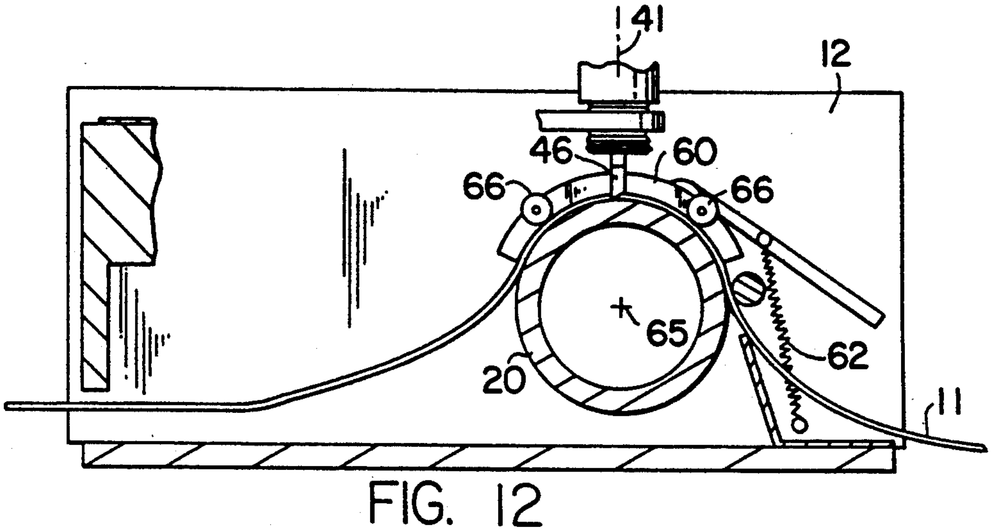
FIG. 12 is an alternative embodiment of the cutting apparatus shown in FIGS. 1-3 wherein the cutting cloth web is advanced by frictional engagement.

Referring now to FIG. 12 it should be seen that the composite cutting cloth webs of FIGS. 6 through 11 are shown with marginal edge portions M,M extending along each lateral side thereof for engagement by appropriate drive means. As seen, the margins M,M in this embodiment do not include the openings 5,5, but rather are adapted for advancement through the machine 12 shown in FIG. 12. This machine is generally identical to that shown in FIGS. 1-3, except that rather than using the pin sprockets 14,14 at each end of the roller 12, the web is supported along its entire width on the roller 20 and is frictionally driven by it along each of the margins M,M. To maintain driving registry between roller and the base layer 30 along the margins M,M, clamp members 60,60 are provided. These clamp members frictionally engage on the margins through the intermediary of rollers 66,66 in turn drawn against it by a biassing means, such as by springs 62,62, thus causing the base layer to be advanced by the rotational movement of the roller 20 or other advancing means, as in the case where the support is a flat surface. It is herein noted that the margins M,M may alternatively include the openings 5,5 and used with the advancement system shown in FIG. 2.

Figure 13:
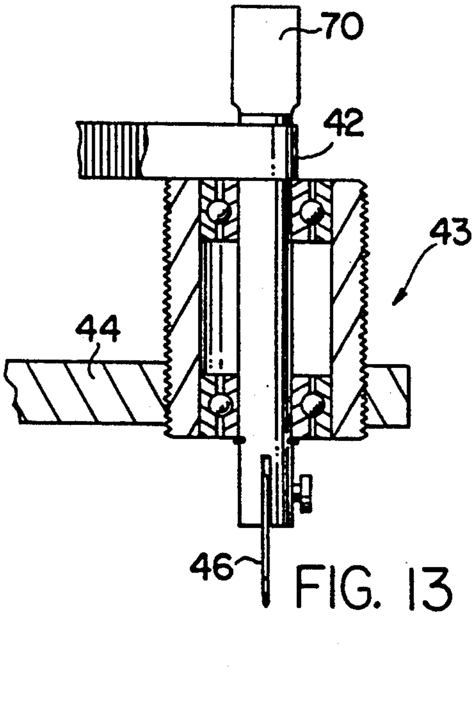
FIG. 13 shows the cutting element of FIG. 3 including a means for aiding in cutting of the fabric material.

As shown in FIG. 13, the cutting implement 46 may be aided in its cutting of the fabric sheet 32 by a means 70. In one embodiment, the means 70 may take the form of an ultrasonic wave generator which produces a standing wave on the blade. In another embodiment, the means 70 may take the form of a heating element which heats the knife blade tip to further aid in its cutting.

While the present invention has been described in the preferred embodiments, it should be understood that numerous modifications and substitutions may be had without departing from the spirit of the invention. For example, while the clamps 60,60 and 31,31 are illustrated as arcuately shaped members, it is nevertheless possible to form these clamps as straight pieces coacting with a correspondingly flat support surface upon which the web is supported during cutting. Also, the cutting implement 46 rather than being a fixed blade may alternatively be a circular type blade which rotates with the movement of the fabric material through the machine, or may be separately rotatably driven by its own drive motor, which blade type being especially effective in use with the webs shown in FIGS. 6-11 wherein the base layer upper surface is not smooth.

Accordingly, the invention has been described by way of illustration rather than limitation.

I claim:

1. A cutting cloth web having a multilayer construction, said web comprising:

a generally elongate base layer of material selected from the group consisting of polycarbonate or heavy paper of a weight between 80-100 pound having a first surface disposed on one side and having a second surface disposed on its side facing oppositely thereof;

a generally elongate sheet of fabric material having a first uncovered exposed surface disposed on one side thereof and a second surface disposed on its opposite side and facing said base layer second surface;

said base layer taken relative to the fabric material sheet being formed such that it resists cutting through by a cutting tool that cuts through the fabric material sheet superimposed on it; and holding means disposed uniformly across said base layer second surface and interposed between said second surface of said fabric material sheet and said second surface of said base layer for releasably holding the fabric material sheet in registry with the base layer such that a closed shape may be cut in the fabric material sheet without disrupting the registration between the base layer and the sheet of fabric material as provided for by the holding means, said web having two marginal side edges engagable with an automated sign maker having a cutting tool to drive the web in coordinated movement relative to the cutting tool.

2. A cutting cloth web as defined in claim 1 further characterized in that said base layer has a release surface disposed on its second surface thereof; and said release surface cooperating with said holding means to allow closed shape portions of said fabric material sheet to be separated from said base layer once cut.

3. A cutting cloth web as defined in claim 2 further characterized in that said holding means includes a layer of permanently a tacky adhesive which adheres more strongly to said fabric sheet second surface than to said release surface when said cut closed shape portions are separated.

4. A cutting cloth web as defined in claim 3 further characterized in that said base layer along each lateral marginal edge thereof has a series of openings spaced sequentially therealong for engagement by means which drives the cutting cloth web through a cutting machine.

5. A cutting cloth web as defined in claim 4 wherein said fabric material layer has a first given width extending transversely to its length and said base layer has a second given width extending transversely to its length; and wherein said first given width is less than said second given width thereby exposing the base layer along each lateral marginal edge.

6. A cutting cloth web as defined, in claim 1 further characterized in that said holding means includes a dry adhesive interposed between said fabric material sheet and said base layer; and wherein said dry adhesive layer is water soluble such that when the fabric material sheet is dampened, the cut closed shape pieces are separated from the base layer.

7. A cutting cloth web as defined in claim 6 further characterized in that said base layer is formed from a heavy paper material and said fabric material is muslin.

8. A cutting cloth web as defined in claim 7 further characterized in that along each lateral side edge of said base layer is disposed a series of sequentially ordered openings each adapted to receive a correspondingly sized drive means associated with it.

9. A cutting cloth web as defined in claim 3 further characterized in that said base layer second surface includes a material having sufficient hardness to deter cutting of an instrument through the base layer and said instrument includes means for aiding in the cutting of the fabric material.

10. A cutting cloth web as defined in claim 6 further characterized in that said base layer second surface includes a material having sufficient hardness to deter cutting by an instrument through the base layer.

11. A cutting cloth web as defined in claim 1 further characterized in that said web is adapted to be advanced through a cutting machine having a cutting implement disposed thereon;

said cutting machine being linked to a computer which defines a desired pattern to be cut into the fabric sheet by the cutting machine when the computer issues commands to do so.

12. A cutting cloth web as defined in claim 11 further characterized in that said cutting implement is drivingly rotated about a theta axis to position its leading edge along a desired line of cut.

13. A cutting cloth web as defined in claim 11 further characterized in that said cutting implement includes a holder for mounting the cutting implement to the machine;

said cutting implement being mounted on said holder such that its cutting edge is offset relative to a theta axis about which it rotates and wherein the movement of the web in opposite directions causes the cutting implement to be directed in a different direction.

14. A cutting cloth web as defined in claim 12 further characterized in that said cutting machine includes means which drivingly engage the web along marginal side edges thereof.

15. A cutting cloth web as defined in claim 13 further characterized in that said cutting machine includes means which drivingly engage the web along marginal side edges thereof.

16. A cutting cloth web as defined in claim 1 further characterized in that said holding means includes a layer of pressure sensitive adhesive which more strongly adheres to the second surface of said base layer than to the fabric material sheet second surface.

17. A cutting cloth web as defined in claim 16 further characterized in that said base layer along each lateral marginal edge thereof has a series of openings spaced sequentially therealong for engagement by means which drives the cutting cloth web through a cutting machine.

18. A cutting cloth web as defined in claim 17 wherein said fabric material layer has a first given width extending transversely to its length and said base layer has a second given width extending transversely to its length; and wherein said first given width is less than said second given width thereby exposing the base layer along each lateral marginal edge.

19. A cutting cloth web having a multilayer construction, said web comprising:

a generally elongate base layer of molded plastic sheet material having a first surface disposed on one side and having a second surface disposed on its side facing oppositely thereof;

a generally elongate sheet of fabric material having a first uncovered exposed surface disposed on one side thereof and a second surface disposed on its opposite side and facing said base layer second surface; and a multiplicity of pointed projections integrally formed with said base and equidistantly spaced from each other at about one-sixteenth to one-eighth inch formed across said base layer second surface such that said projections are interposed between said second surface of said fabric material sheet and said second surface of said base layer for releasably holding the fabric material sheet in registry with the base layer by gripping between the fabric crossings of said fabric material such that a closed shape may be cut in the fabric material sheet without substantially disrupting the registration between the base layer and the sheet of fabric material as provided for by the projections, said web having two marginal side edges engagable with an automated sign maker having a cutting tool to drive the web in coordinated movement relative to the cutting tool.

20. A cutting cloth web having a multilayer construction, said web comprising:

a generally elongate base layer of molded plastic sheet material having a first surface disposed on one side and having a second surface disposed on its side facing oppositely thereof;

a generally elongate sheet of fabric material having a first uncovered exposed surface disposed on one side thereof and a second surface disposed on its opposite side and facing said base layer second surface; and a multiplicity of hook-shaped members integrally formed with said base emanating from said second surface of said base layer and being so sized relative to the fabric material as to be trapped within the interstitial spacings of the threads of the fabric material in registry with the base layer, said multiplicity of hook-shaped members being interposed between said second surface of said fabric material sheet and said second surface of said base layer for releasably holding the fabric material sheet in registry with the base layer such that a closed shape may be cut in the fabric material sheet without substantially disrupting the registration between the base layer and the sheet of fabric material as provided for by the hook-shaped members, said web having two marginal side edges engagable with an automated sign maker having a cutting tool to drive the web in coordinated movement relative to the cutting tool.

21. A cutting cloth web having a multilayer construction, said web comprising:

a generally elongate base layer of molded plastic sheet material having a first surface disposed on one side and having a second surface disposed on its side facing oppositely thereof;

a generally elongate sheet of fabric material having a first uncovered exposed surface disposed on one side thereof and a second surface disposed on its opposite side and facing said base layer second surface, said second surface being provided with a layer of pressure sensitive adhesive thereon; and a multiplicity of flexible support elements integrally formed with said base and extending from said base layer second surface, said flexible support elements each having a stem integrally formed with said base layer second surface and having an associated head connected to the stem in a spatial relationship from the base layer second surface, said flexible support elements being interposed between said second surface of said fabric material sheet and said second surface of said base layer for releasably holding the fabric material sheet in registry with the base layer such that a closed shape may be cutting the fabric material sheet without substantially disrupting the registration between the base layer and the sheet of fabric material as provided for by the support members said web having two marginal side edges engagable with an automated sign maker having a cutting tool to drive the web in coordinate movement relative to the cutting tool.

22. A cutting cloth web as defined in claim 19 further characterized in that said web is adapted to be advanced through a cutting machine having a cutting implement disposed thereon;

said cutting machine being linked to a computer which defines a desired pattern to be cut into the fabric sheet by the cutting machine when the computer issues commands to do so;

said cutting machine includes means which drivingly engage the web along marginal side edges thereof, and said fabric material layer has a first given width extending transversely to its length and said base layer has a second given width extending transversely to its length; and wherein said first given width is less than said second given width thereby exposing the base layer along each lateral marginal edge.

23. A cutting cloth web as defined in claim 20 further characterized in that said web is adapted to be advanced through a cutting machine having a cutting implement disposed thereon;

said cutting machine being linked to a computer which defines a desired pattern to be cut into the fabric sheet by the cutting machine when the computer issues commands to do so;

said cutting machine includes means which drivingly engage the web along marginal side edges thereof, and said fabric material layer has a first given width extending transversely to its length and said base layer has a second given width extending transversely to its length; and wherein said first given width is less than said second given width thereby exposing the base layer along each lateral marginal edge.

24. A cutting cloth web as defined in claim 21 further characterized in that said web is adapted to be advanced through a cutting machine having a cutting implement disposed thereon;

said cutting machine being linked to a computer which defines a desired pattern to be cut into the fabric sheet by the cutting machine when the computer issues commands to do so;

said cutting machine includes means which drivingly engage the web along marginal side edges thereof, and said fabric material layer has a first given width extending transversely to its length and said base layer has a second given width extending transversely to its length; and wherein said first given width is less than said second given width thereby exposing the base layer along each lateral marginal edge.

25. A cutting cloth web as defined in claim 20 wherein said fabric material layer has a first given width extending transversely to its length and said base layer has a second given width extending transversely to its length; and wherein said first given width is less than said second given width thereby exposing the base layer along each lateral marginal edge.

26. A cutting cloth web as defined in claim 20 wherein said fabric material layer has a first given width extending transversely to its length and said base layer has a second given width extending transversely to its length; and wherein said first given width is less than said second given width thereby exposing the base layer along each lateral marginal edge.

27. A cutting cloth web as defined in claim 21 wherein said holding means further includes a layer of pressure sensitive adhesive interposed between the upper surface of said support elements and said second surface of said fabric material sheet.

* * * * *